March 1, 1949.  B. C. DAY  2,463,156

BEVEL GEAR HOLDING MECHANISM

Filed April 17, 1945  2 Sheets-Sheet 1

Inventor
Bernard C. Day
by Wright Brown Quinby & May
Attys.

March 1, 1949. B. C. DAY 2,463,156
BEVEL GEAR HOLDING MECHANISM
Filed April 17, 1945 2 Sheets-Sheet 2

Inventor
Bernard C. Day

Patented Mar. 1, 1949

2,463,156

UNITED STATES PATENT OFFICE 2,463,156

BEVEL GEAR HOLDING MECHANISM

Bernard C. Day, Springfield, Vt., assignor to Bryant Chucking Grinder Company, Springfield, Vt., a corporation of Vermont Application April 17, 1945, Serial No. 588,759

2 Claims. (Cl. 279—1)

This invention relates to devices for supporting bevel gears and has for an object to provide such a device which supports the gear in definite relation to its pitch cone, and which can correctly so support the gear regardless of whether the gear teeth are straight, skewed, or spiral.

A further object is to provide such supporting means which is applicable to support a gear accurately in a chuck in which the gear may be clamped in coaxial relation to the gear pitch cone.

In accordance with this invention, gear teeth engaging elements having spherical teeth-engaging faces are employed.

For a complete understanding of this invention, reference may be had to the accompanying drawings in which Figure 1 is a front elevation of a chuck embodying the invention.

Figure 1:
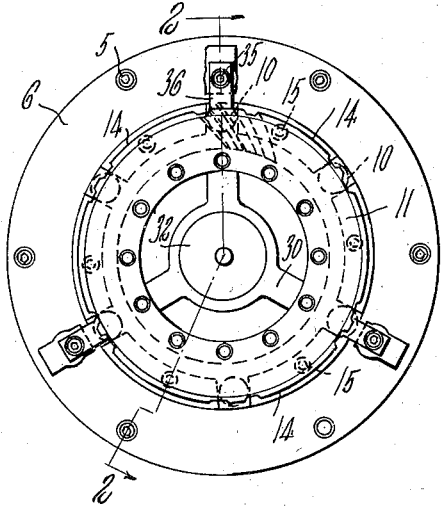
Figure 2:
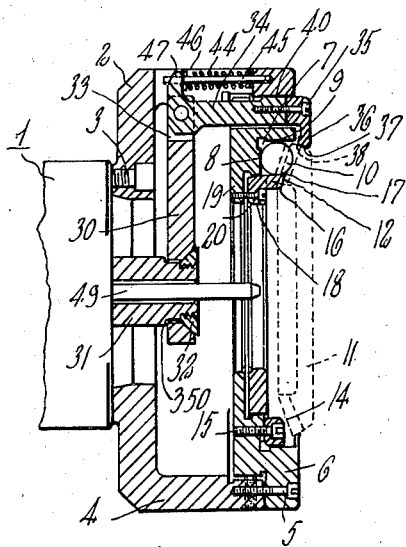
Figure 2 is a fragmentary view partly in side elevation and partly in section on line 2—2 of Figure 1.

Referring to the drawings, Figures 1 and 2 show a chuck embodying a holder constructed in accordance with this invention. As shown the chuck body 2 is attached to a work spindle 1 as by screws 3 in coaxial relation. The portion 2 has a forwardly extending circular flange 4 to the outer extremity of which is secured, as by the screws 5, a ring member 6. Means for rigidly spacing the bevel gear teeth-engaging elements, these elements being held between angularly related locating faces, is broadly claimed in the Day et al. Patent No. 2,443,895 granted June 22, 1948. This ring member has an annular way 7 in its outer face formed by two faces 8 and 9 disposed at right angles to each other, and in this way there may be placed a plurality of balls 10, spaced therearound in accordance with the spacing of teeth of a bevel gear shown in dotted lines at 11. There may be a much smaller number of balls 10 than there are spaces between the teeth of the gear to be supported, and they may be spaced angularly within the way and rigidly so held by a plurality of segmental spacing blocks 14 which may be secured in position by screws 15 which enter into the forward face of the ring 6.

Figure 3:
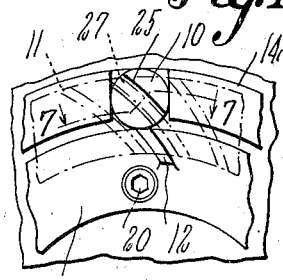
Figure 3 is a fragmentary front elevation, the gear being omitted and arranged to support a gear with helical teeth.
Figure 3A:
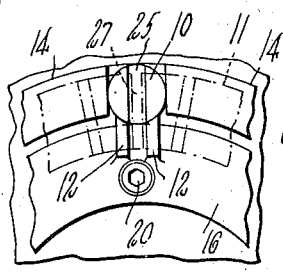
Figure 3a is a view similar to Figure 3, but showing the supporting means particularly constructed to support a bevel gear having straight teeth.
Figures 13, 14, 15:
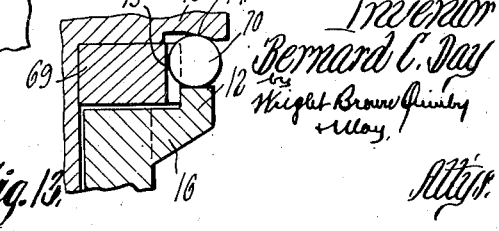
Figure 13 is a view similar to a portion of Figure 10, but to a larger scale.
Figure 14 is a detail front elevation to a larger scale of the construction shown in Figure 9 constructed for supporting a bevel gear having helical teeth.
Figure 15 is a view similar to Figure 14, but showing the construction for supporting straight teeth.

The balls may be held in position within the way 9, and for this purpose, a ring 16 is shown having outwardly extending fingers 12 each having a flaring outer face 17. This ring 16 may have a central internal flange 18 which is positioned opposite to a similar flange 19 on the ring member 6, and these two may be secured together as by screws 20, the tightening of these screws bringing the enlarged diameter end portions of the fingers 12 into engagement with the balls 10, and clamping them against the faces 8 and 9.

Where the fingers such as 12 are employed to engage one side of each of the gear supporting elements such as the balls, these fingers have to pass between adjacent teeth of the gear. Where the teeth are spiral teeth as shown in Figures 3 and 14, the fingers 12 have to be correspondingly shaped or inclined relative to a radius of the supporting ring. Where the gear teeth are straight, the fingers 12 are arranged radially as shown in Figures 3a to 15, and where the ball is of sufficient diameter to engage the faces of non-adjacent teeth and is notched to permit the intermediate tooth to pass therethrough, a plurality of fingers 12 arranged to engage the supporting element on either side of the gear tooth which engages in the element slot will be employed as shown in Figure 3a. When a smaller diameter ball is employed which engages with adjacent gear teeth, a single finger 12 only will be employed for each ball as shown in Figure 15. While in Figure 3 the supporting element is shown as a ball having a slot therein to receive one of the gear teeth of a spiral or helical gear, a single finger 12 is sufficient to hold each ball in place for the reason that due to the angularity of the teeth and slot, a single finger 12 only is in position to properly engage the ball to retain it within its retaining annular way.

Figure 7:
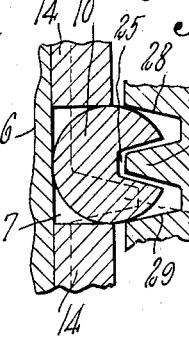
Figure 7 is a sectional view on line 7—7 of Figure 3.

As shown in Figures 1, 3 and 7, the balls 10 may be provided with slots 25 cut therethrough to permit the entry in each of one of the gear teeth 27, the balls 10 engaging with their spherical surfaces against the adjacent faces 28 and 29 of the gear teeth on either side of the tooth 27. The balls 10 engage teeth of the bevel gear in definite relation to the pitch cone of the gear, and the gear may be clamped in position thereagainst as is necessary where the holder is incorporated in a rotating chuck.

One means for so holding the bevel gear is shown in Figure 2. As shown therein at 30 is a spider rockably attached to the forward end of a sleeve 31 as by a nut 32 threaded on the forward end thereof, and having a spherical face engaging a conical face of the spider. The spider has pivoted thereto and riding in slots 33 through the ring 6 at angularly spaced points, arms 34 to the forward end of each of which is fixed, as by a screw 35, a finger 36. This finger has a beveled inner end, as 37, which may engage against a forward inclined face 38 of the gear, such engagement holding the gear back against the balls 10. The rockable mounting of the spider 30 permits equalization of the holding pressure exerted on the gear by the finger 36. Each of the arms 34 is provided with a cam face 40 near its outer end which cooperates with the inner face of the slot 33 when the spider is pulled back to the position shown in Figure 2, so as to rock each of the arms 34 inwardly toward the axis of the gear and clamp the gear in position. By moving the sleeve 31 forwardly, a shoulder 350 thereon engages and pushes the spider 30 outwardly, bringing the cam faces 40 outwardly of the ring 6, so that the arms 34 are permitted to spring outwardly away from contact with the gear, this being effected by a coil spring 44 surrounding a guide pin 45 and reacting between the inner forward face of a recess 46 through the flange 4, and a tail piece 47 on each of the arms 34. A work ejector 49 may extend through the sleeve 31 and be axially movable to engage and force work out from the chuck when desired.

Figure 4:
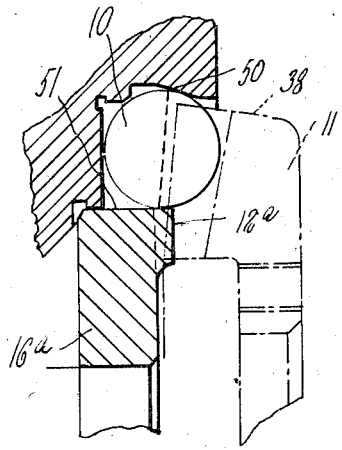
Figure 4 is a view similar to a portion of Figure 2, but to a larger scale and showing a modification.

In Figure 4, a modified arrangement for holding the balls 10 in position is shown in which the outer wall of the ball-receiving recess at 50 has an inwardly inclined portion against which the balls are held by engagement with a cylindrical outer face 51 on a ring 16a shown in Figure 2. On the forward end face of the ring 6a are fingers 12a projecting between the teeth of the gear held by the chuck.

Figure 8:
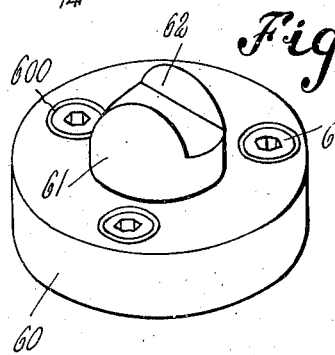
Figure 8 is a perspective view of the tooth support used in the construction of Figures 5 and 6.
Figure 5:
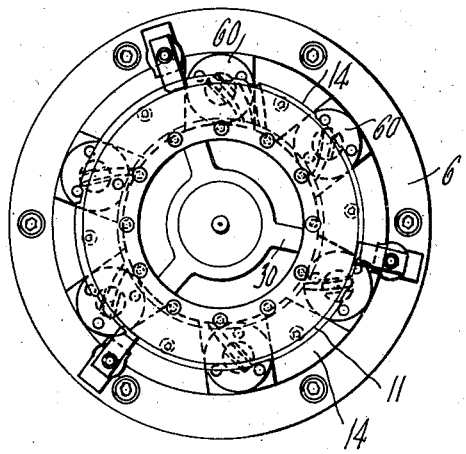
Figures 5 and 6 are views similar to Figures 1 and 2, respectively, but showing a further modification.
Figure 6:
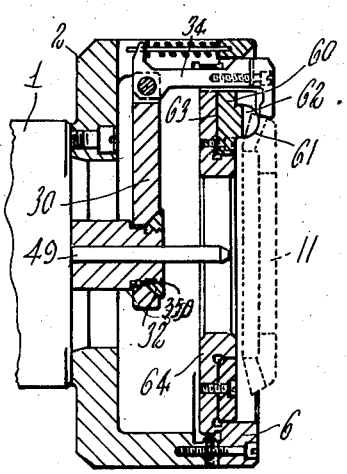
Figure 9:
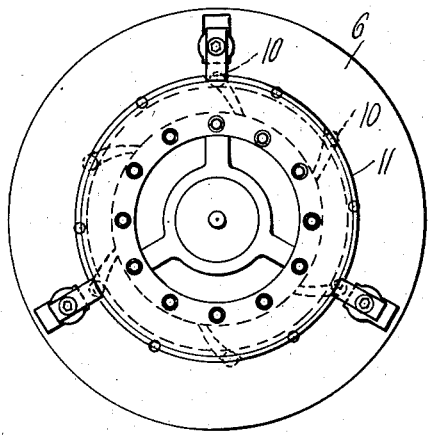
Figures 9 and 10 are views similar to Figure 1 and a portion of Figure 2, respectively, but showing still another modification.
Figure 10:
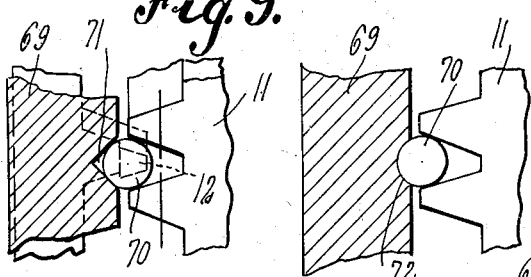

In Figures 5, 6 and 8 a different form of element for engagement with the gears is shown, this element comprising a base 60, provided with a spherical ended extension 61 which may be provided with a transverse slot 62, similar to the slot 25 of the ball 10. The base 60 may be provided with holes for the reception of Allen screws 600 by which the element 60 may be secured in position in an annular way 63 in a ring 64, this ring having the function of the ring 6 of Figure 2. One of the gear teeth may lie within the slot 62 and the spherical side walls outwardly thereof engage the adjacent sides of the teeth next to the one lying within the slot. The gear may be held in position properly engaged with the element 60 by clamping mechanism shown in Figure 6 identical with that illustrated in Figure 2.

Figures 11, 12:
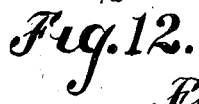
Figure 11 is a detail section view to a larger scale on line 11—11 of Figure 10.
Figure 12 is a view similar to Figure 11, but showing a modification.

It is also possible to employ individual balls for engagement between adjacent teeth of the gear as shown in Figures 9 to 15. The rear face of the annular way 69 within which these balls 70 are supported may be provided with conical or spherical recesses 71 or 72, respectively, as shown in Figures 11 and 12 within which the balls 70 may rest, this providing the desired spacing therebetween and eliminating the need for spacing blocks between the gear teeth engaging elements. The balls 70 may be held in position in engagement with the two faces 73 and 74, shown in Figure 13, by fingers 12 of the clamping ring 16, and as shown in Figure 14, when the gear to be supported has spiral teeth, the fingers 12 will be inclined to the radial in order to pass in between the gear teeth, while when the teeth of the gear are radial, the fingers 12 will also be radial as shown in Figure 15. The faces 73 and 74, as shown in Figure 13, are on the ring element 69 which has the recesses 71 or 72 to receive the balls, while the face 74 is on the outer flange of the annular support 75, which takes the place of the ring member 6 shown, for example, in Figures 1 and 2 and 5 to 9, respectively.

From the foregoing description of certain embodiments of this invention, it should be understood by those skilled in the art that various other changes and modifications might be made without departing from the spirit or scope of this invention.

I claim:

1. A holder for bevel gears comprising an annular support having depressions in one face coaxial therewith, an element seated in each of said depressions and having a spherical face portion for engagement with side faces of teeth of a bevel gear on said holder, a spider movable axially of said support, a plurality of clamping arms pivoted to said spider, a ring supported coaxially with said support, said ring and arms having cam parts cooperating when said spider is moved in one direction to force said arms inwardly into clamping engagement with a bevel gear engaging said elements, yielding means for swinging said arms out of clamping position when permitted by said ring, and means for moving said spider.

2. A holder for bevel gears comprising an annular support having depressions in one face coaxial therewith, an element seated in each of said depressions and having a spherical face portion for engagement with side faces of teeth of a bevel gear on said holder, a spider movable axially of said support, a plurality of clamping arms pivoted to said spider, a ring supported coaxially with said support, said ring and arms having cam parts cooperating when said spider is moved in one direction to force said arms inwardly into clamping engagement with a bevel gear engaging said elements, yielding means for swinging said arms out of clamping position when permitted by said ring, and means for moving said spider and with which said spider rockingly engages to permit equalization of pressure exerted by said fingers on said gear.

BERNARD C. DAY.

REFERENCES CITED

The following references are of record in the file of this patent:

UNITED STATES PATENTS

| Number | Name | Date |
| --- | --- | --- |
| 1,022,761 | Stvanek | Apr. 9, 1912 |
| 1,058,237 | Heald | Apr. 8, 1913 |
| 1,561,843 | Garrison | Nov. 17, 1925 |
| 1,577,299 | Rohde | Mar. 16, 1926 |
| 1,664,085 | Naylon | Mar. 27, 1928 |
| 1,685,235 | Kempton et al. | Sept. 25, 1928 |
| 2,153,829 | Garrison | Apr. 11, 1939 |
| 2,354,816 | Klomp | Aug. 1, 1944 |